Dec. 7, 1954  L. L. STOTT  2,696,023
METHOD FOR MOLDING ARTICLES FROM PLASTIC MATERIALS
Filed July 11, 1949  4 Sheets-Sheet 2
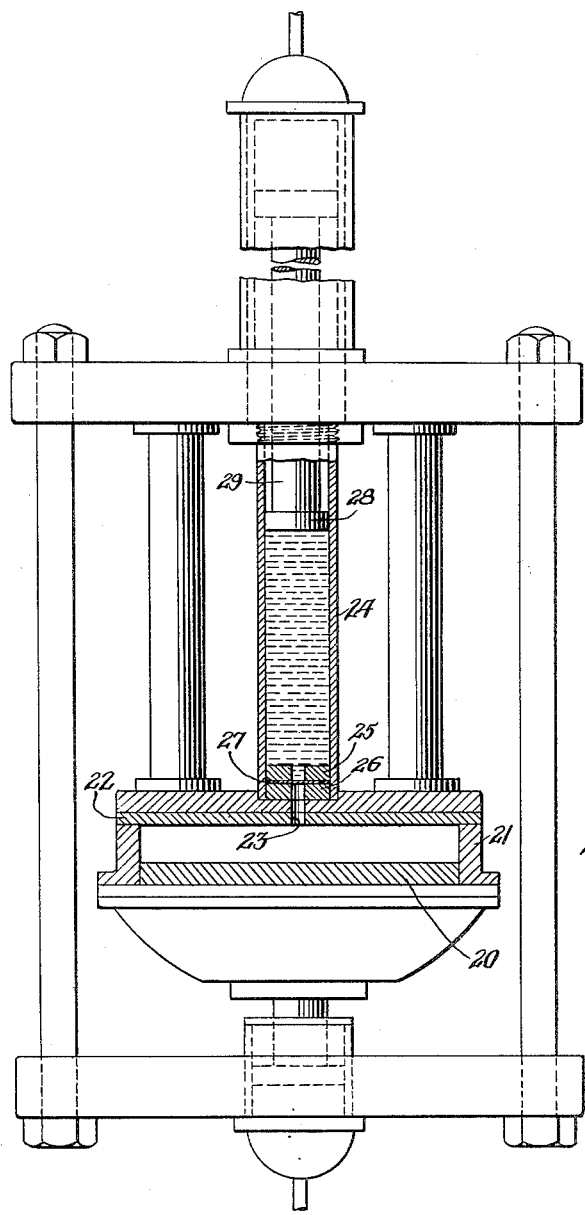
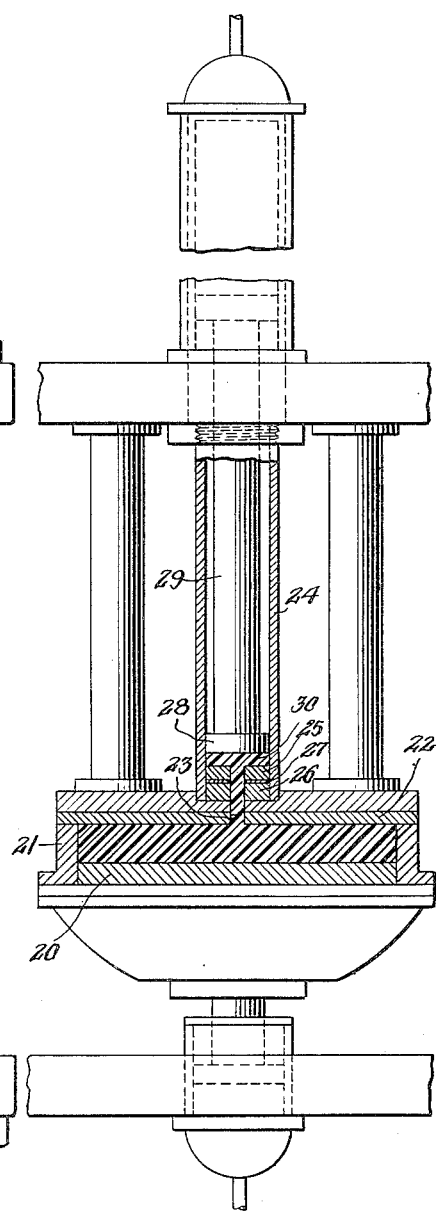
INVENTOR
Louis L. Stott
BY
ATTORNEYS

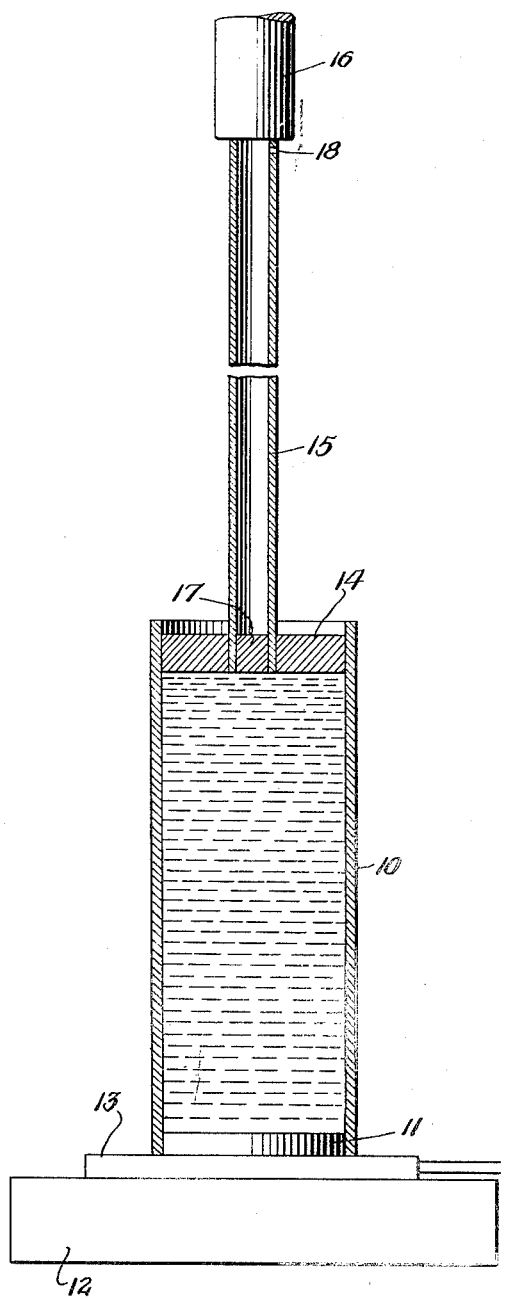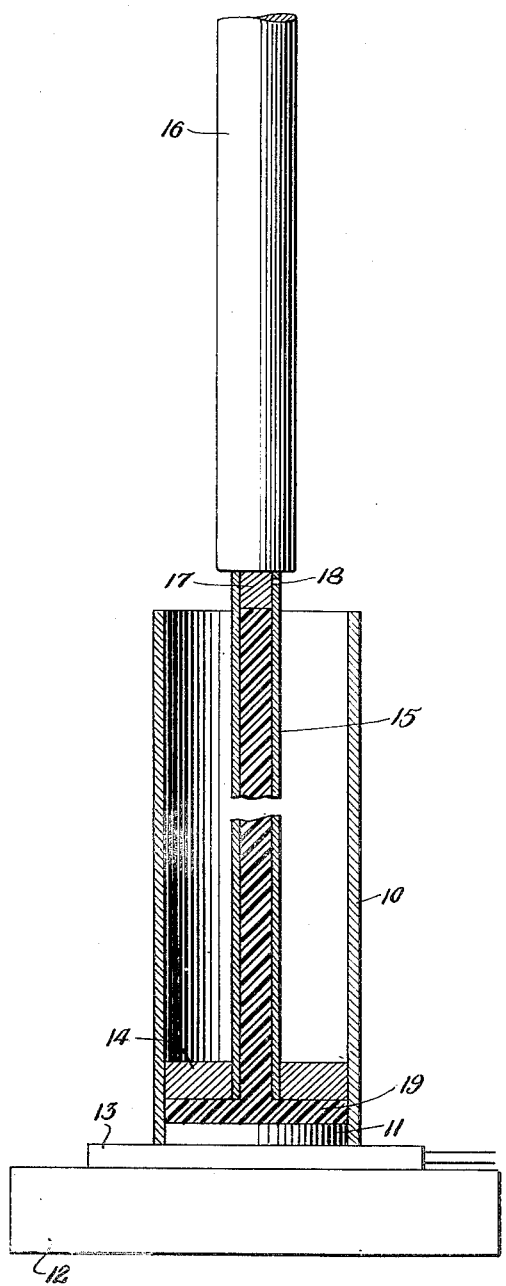

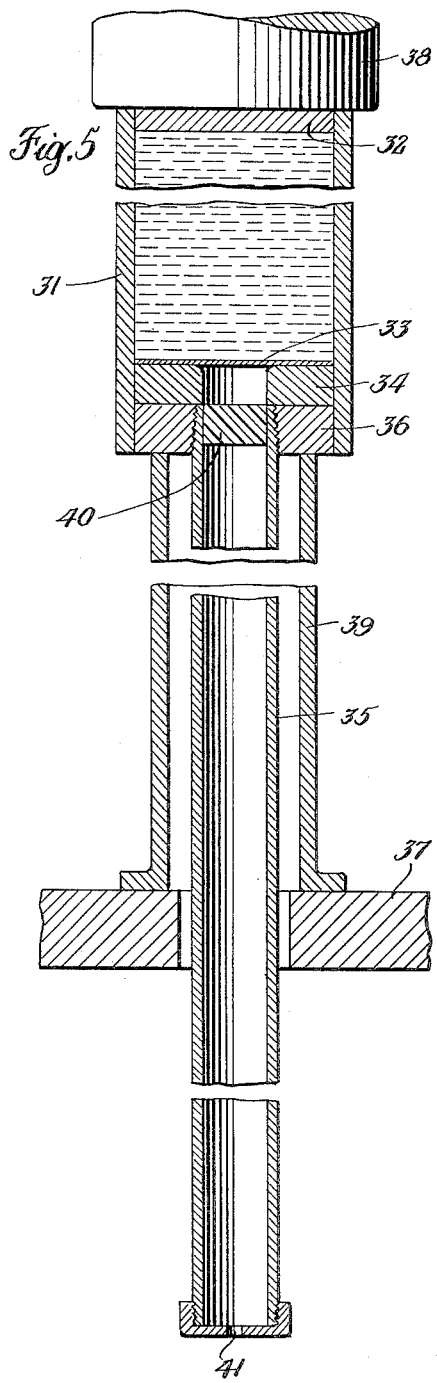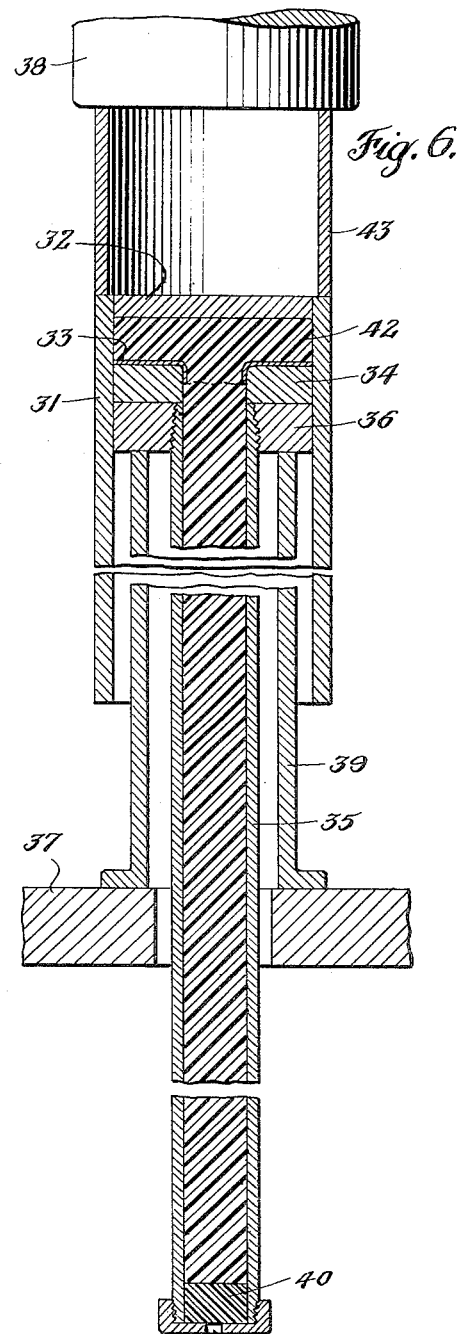

Dec. 7, 1954　　　　　　　L. L. STOTT　　　　　　2,696,023
METHOD FOR MOLDING ARTICLES FROM PLASTIC MATERIALS
Filed July 11, 1949　　　　　　　　　　　　　　4 Sheets-Sheet 4
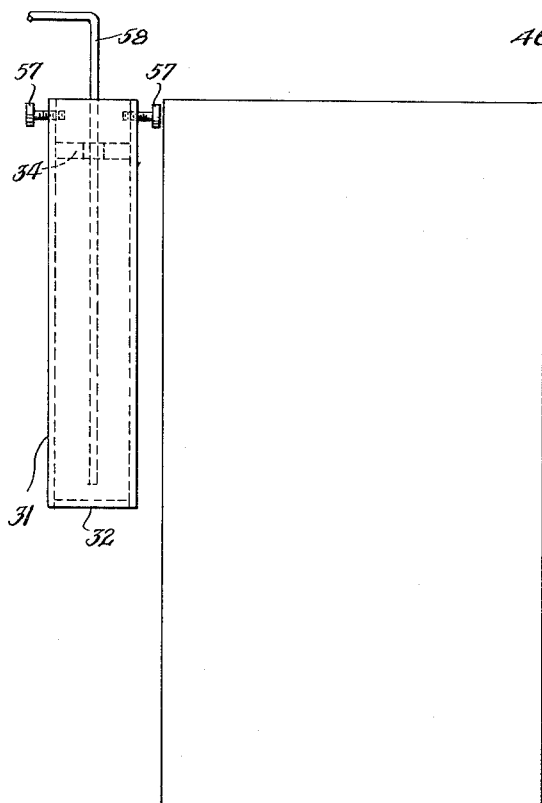
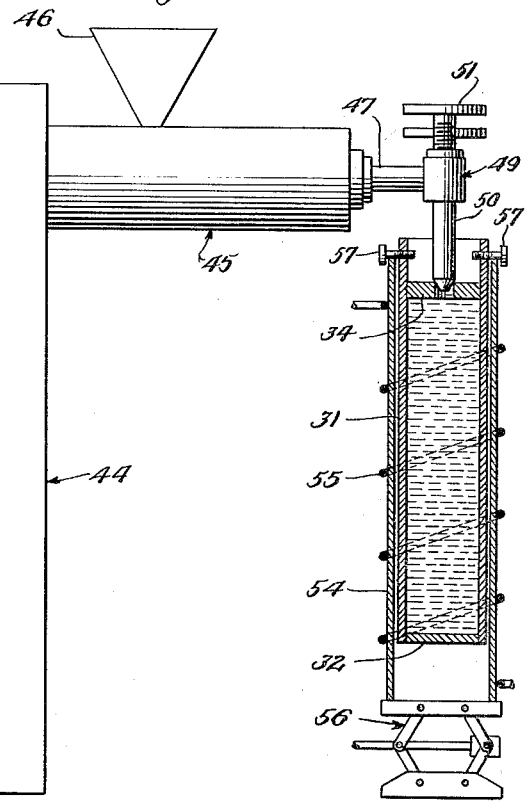
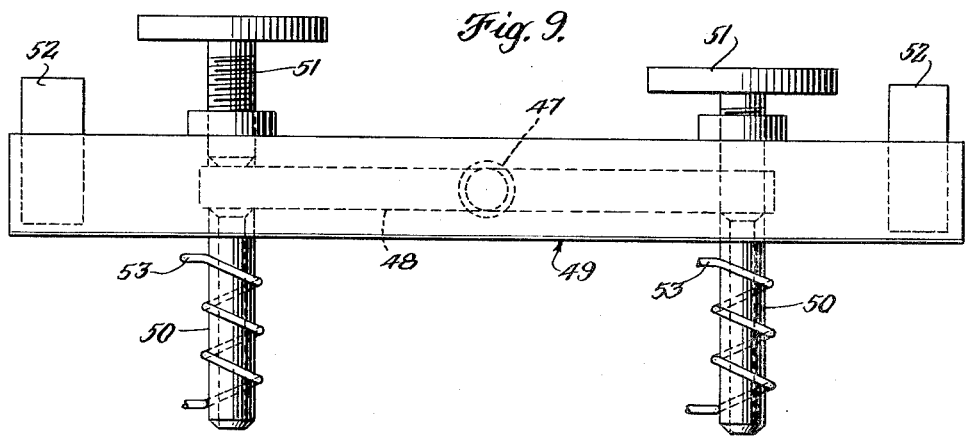
INVENTOR
Louis L. Stott
BY
ATTORNEYS

United States Patent Office 2,696,023
Patented Dec. 7, 1954

2,696,023

METHOD FOR MOLDING ARTICLES FROM PLASTIC MATERIALS

Louis L. Stott, Reading, Pa., assignor to The Polymer Corporation, Reading, Pa., a corporation of Pennsylvania Application July 11, 1949, Serial No. 103,974

10 Claims. (Cl. 18—55)

This invention relates to molding of plastic type materials, and is especially concerned with the formation of molded pieces from synthetic linear polyamides, particularly the high melting polyamides such as polyhexamethylene adipamide. Certain features of the invention are of especial advantage and utility in the formation of rod stock, either of round or of angular section.

The invention is especially concerned with certain method steps utilized in the molding operation itself, all of which steps are of importance in simplifying the molding operation and in increasing the quality of the rods or other pieces formed. More specifically, the invention is concerned with that kind of molding operation in which a charge of the polyamide in molten condition is driven under pressure from a cylindrical container into a mold conforming with the shape of the piece desired to be molded. Equipment for carrying out this general kind of molding operation is disclosed and claimed in my copending applications Serial Nos. 624,241, filed October 24, 1945, issued January 19, 1951, as Patent No. 2,537,285, and 693,627, filed August 29, 1946, now abandoned, of which the present application is a continuation-in-part.

One of the major objects of the invention herein claimed is to avoid irregular or uneven cooling and solidification of the polyamide or nylon being molded. To this end, the invention contemplates preheating the mold prior to delivery of the molten nylon thereto from the cooperating charged container. By such preheating, and especially when utilizing certain temperatures of preheat, as more fully set out hereinafter, substantial improvement is effected in the quality of pieces molded.

A further feature of the invention is to provide an appreciable excess of molden polyamide in the container, i. e., a volumetric excess in relation to the volume of the piece being molded, which excess acts as a feeder head during the pressure molding operation, this being of especial importance in the molding of the high melting point polyamides such as polyhexamethylene adipamide which are characterized by high volumetric shrinkage upon solidification or freezing.

With the mold itself preheated and with the excess molten material providing a feeder head, during the cooling operation the cooling is effected gradually (and in the case of rod molding, the cooling is effected from the end of the mold tube remote from the container progressively toward the feeder head), and the piece being formed thus solidifies gradually (or directionally in the case of a rod), and the feeder head supplies additional molten material to the mold so as to prevent the formation of voids in consequence of the shrinkage occurring upon solidification.

There is still another and very important advantage in the employment of the excess material. In the case of rod molding such excess after solidification constitutes an enlargement integrally molded with one end of the rod being formed; and this enlargement serves as a handle or the like, by means of which the solidified piece may readily be drawn out of the mold endwise and under tension. The specific way in which this object and advantage is attained will appear more fully hereinbelow, but it is here mentioned that the provision of a "handle" is of especial importance when molding quite long and small diameter rod stock, which would be almost impossible to remove from the mold if reliance had to be placed upon application of pressure at one end of the molded piece.

How the foregoing and other objects and advantages are attained will appear more fully from the following description referring to the accompanying drawings, in which:

Figures 1 and 2 are vertical sectional views of molding equipment usable in accordance with the invention, this form of equipment also being disclosed in my copending application Serial No. 624,241, above identified;

Figures 3 and 4 are views similar to Figures 1 and 2, but illustrating a modified form of molding equipment usable according to the present invention, which modified form is disclosed in my copending application Serial No. 693,627, above identified;

Figures 5 and 6 are corresponding views of still another form of mechanism usable according to the present invention, this mechanism also being disclosed in copending application of myself and Eugene E. Montross, Serial No. 729,330, filed February 18, 1947, issued October 9, 1951, as Patent No. 2,570,284, and Figures 7, 8 and 9 are views illustrating still another form of mechanism usable according to the present invention, especially for the purpose of charging molten material into pressure containers of the type shown, for example, in Figures 1 to 6 inclusive; Figure 7 being a side elevational view of a pressure container; Figure 8 being a somewhat diagrammatic outline view of a screw extruder, with a pressure container, shown in vertical section, associated therewith; and Figure 9 being an enlarged view of certain details of the extruder nozzle.

Referring first to the form of mechanism shown in Figures 1 and 2, the pressure container is there identified by the numeral 10, this container taking the form of a cylinder or sleeve, the lower end of which is closed by a removable plug 11, preferably formed of a metal having a coefficient of thermal expansion somewhat higher than that of the container 10. The lower end of the container is adapted to rest upon the bed of a press, such as indicated at 12. An electric heater element 13 may be interposed, for a purpose to be described hereinafter. A slidable plug 14 is connected with the lower end of the mold tube 15, so that when the plug 14 is forced down into the container 10, the molten polyamide material therein will be forced upwardly into the mold tube. This plug 14 is of course circular so as to fit the cylindrical tube 10 and is also of relatively small axial dimension, as compared with the length of the container, so that a liquid-tight fit may readily be obtained between the plug and the container wall. In this way the plug effectively serves as a pressure piston and the molten polyamide will not pass the piston notwithstanding the fact that it is of quite low viscosity in the molten condition. The upper end of the mold tube 15 is adapted to be engaged by a press plunger such as shown at 16. A slidable plug 17 may be positioned in the entrance end of the mold tube 15, and a vent in the upper end of the tube, as shown at 18, may be provided. these features serving to drive out the air from the mold tube in advance of the incoming polyamide, in the manner fully set out in my copending application 624,241, above referred to.

It may here be mentioned that the equipment of Figures 1 and 2 is adaptable to the molding of rods or elongated pieces of a variety of cross sections. This may readily be done, since the required high pressure may be developed by the cylindrical plug 14 working within the cylindrical container 10.

In a typical molding operation, when using the equipment of Figures 1 and 2, the container 10 is first charged with polyamide in granular form, for instance with polyhexamethylene adipamide, and the container is then heated, for instance in a salt bath, so as to melt the polyamide. This heating may be effected, if desired, while the mold tube 15 and the plug 14 are assembled with the container 10, or, alternatively, the mold tube and the container may be heated separately. In any event, it is also contemplated that the mold tube 15 be preheated, preferred ranges for such preheating being given herebelow. When the nylon has been melted and the mold has been preheated, the assembly is inserted in a press, as shown in Figure 1, and the press plunger is then brought down to force the molten polyamide from the container 10 endwise into the mold tube. This molding is effected under high pressure, as is mentioned more fully herebelow, and upon cooling, the polyamide solidifies, as is indicated in Figure 2.

It should here be noted that it is contemplated, according to the invention, that the container 10 be charged with an excess of material, i. e., somewhat more material than required to fill the mold tube 15. This not only provides the feeder head of molten nylon above referred to, but also results in formation of the flange or enlargement 19 shown in Figure 2, which is molded integrally with the piece being formed. During the initial stages of the molding operation, especially while the polyamide is solidifying and thus shrinking within the mold tube, the use of a heater element 13 will help to retain the feeder head in molten condition and thereby facilitate flow of the material from the feeder head into the mold tube to compensate for the shrinkage.

After the material in the mold tube has dropped in temperature well known the solidification temperature, the heater element 13 may be disconnected and the temperature of the polyamide comprising the enlargement 19 drops below the solidification temperature, and in this way a convenient "handle" is molded directly to the end of the rod being formed and is conveniently employed to draw the rod out of the mold tube under tension. As above indicated, this is of especial advantage when molding long pieces of small diameter, such as polyhexamethylene adipamide and polyhexamethylene sebacamide. It is also of especial importance when molding elongated pieces of larger diameter from certain polyamides which do not have appreciable shrinkage upon solidification and which therefore are likely to be more difficult to remove from the mold tube than pieces made of those polyamides which shrink upon solidification. Examples of such other polyamides are various of the interpolymers of polyhexamethylene adipamide with other polyamides such as polyhexamethylene sebacamide. It may here also be mentioned that the polyamides which may be used may or may not contain other ingredients, such as fillers, plasticizers, antioxidants, etc.

The equipment of Figures 3 and 4 is briefly described just below, although it is here mentioned again that this form of equipment is fully disclosed in my copending application Serial No. 693,627, above identified.

The form of equipment illustrated in Figures 3 and 4 is of especial advantage in the molding of pieces of relatively large cross section, such as slabs. The equipment here shown comprises a mold made up of bottom, side, and top plates 20, 21 and 22, the top plate 22 having an entrance port 23 through which molten polyamide is adapted to be delivered from the container 24. The container 24 has an assembly of apertured plugs 25—26 in its lower end, with an intervening thin diaphragm 27 which is rupturable under the influence of pressure applied to the material in container 24 at the beginning of the molding operation. The container 24 may be charged with polyamide in granular or flake form, as in the case of the equipment of Figures 1 and 2, and a plug 28 may be inserted on top of the packed charge. Upon melting of the charge in the container 24, and upon preheating of the mold 20—21—22, the container and mold may be assembled in a press mechanism, the details of which need not be considered herein, and pressure applied as by the press plunger 29 to the upper plug 28 in the container 24 so as to build up a pressure which will rupture the diaphragm 27 and drive the molten material into the mold cavity.

As in the operation of the equipment of Figures 1 and 2, it is again contemplated that the container 24 be charged with a quantity of polyamide in excess of that required to fill the mold cavity, so that when the press plunger is brought down, for example, to the position indicated in Figure 4, a feeder head of material 30 will remain, representing the excess beyond that required to fill the mold. During the initial solidification and shrinkage of the piece being formed, material is, of course, fed from this feeder head through the port 23 to compensate for shrinkage.

Still another form of equipment which may be used in practicing the method of the present invention is illustrated in Figures 5 and 6, this equipment, as above mentioned, also being disclosed in the copending application Serial No. 729,330, above identified. Here, the container is indicated at 31, one end of the container being closed by a plug 32. For the purpose of charging the container 31, it may be initially positioned on the work table or the like, with the plug 32 at the bottom, so that the flake material may be introduced into the open upper end (the lower end of the container when viewed as in Figures 5 and 6). After the material is charged into the container, the rupturable diaphragm 33 may be inserted, and following this, an apertured plug 34. The charged and closed container may then be heated to melt the polyamide, as before.

In the arrangement of Figures 5 and 6, the mold tube 35 has a ring 36 secured thereto, the ring having an external cylindrical surface adapted to snugly fit the bore of the container 31. In the use of the equipment of Figures 5 and 6, it is also contemplated that the mold tube shall be preheated; and to effect the molding of the rod, a preheated mold and a container having a charge of molten polyamide are assembled in the relation shown in Figure 5, and this assembly is mounted in a press having a base or bed plate 37 apertured to pass the mold tube and further having a press plunger such as indicated at 38. A sleeve 39 is interposed between the ring or abutment 36 and the base 37 of the press. The press plunger is then operated and the pressure developed within the container 31 ruptures the diaphragm 33 and drives the molten polyamide into the mold tube. A slidable plug 40, initially inserted in the entrance end of the mold tube is then driven to the bottom of the tube just ahead of the molten material, so as to drive out any air through the vent 41 at the bottom.

Here again it is contemplated that the container 31 be charged with an excess of material to provide the feeder head above referred to, and further so that at the conclusion of the molding operation an enlargement 42 will be provided at one end of the rod formed. The showing of Figure 6 illustrates the condition of the parts after the conclusion of the molding operation and after the press plunger 38 has again been drawn upwardly and a sleeve 43 inserted between the plunger and the upper edge of the container tube 31. By bringing the plunger 38 downwardly again, this arrangement displaces the container tube 31 downwardly so as to drive the elements 32, 42, 34 and 36 out of the end of the container tube. This constitutes an effective and simple method for separating the plugs from the container, and this technique may be used in connection with any of the molding equipments herein shown. The enlargement 42 may then be used as a handle for the purpose of drawing the formed piece from the mold tube 35.

According to the above description of the method as carried out in the several forms of equipment shown in Figures 1 to 6 inclusive, reference is made in each case to the charging of unmelted flake or granular polyamide into the container and to the melting of the polyamide in the container. An alternative method for charging the containers is illustrated in Figures 7, 8 and 9, and described just below.

Figure 8 shows in diagrammatic outline a mounting 44 for a screw extruder device generally indicated at 45. The details of construction of this device need not be considered herein, since they form no part of the present invention per se, but it is here mentioned that polyamide in flake form may be fed to the extruder by means of the funnel 46 which delivers the material to the screw within the extruder 45. Heater elements associated with the extruder 45 melt the polyamide and deliver the same in molten condition through the connection 47, which in turn communicates with a double ended passage 48 in the distributing device 49. The ends of the passage 48 are each provided with a nozzle 50, communication between the passage 48 and the nozzles 50 being controlled by valves 51—51.

The distributor device 49 preferably comprises a bore of metal having appropriate passages drilled therein and further having cavities adapted to receive heater elements diagrammatically indicated at 52—52, which serve to transfer heat to the distributor device, to thereby prevent undue chilling of the molten polyamide flowing therethrough. Heater elements 53—53, for instance in the form of electrical heaters, are advantageously wound around the nozzles 50, for this same purpose. Below each of the nozzles 50, a heated chamber 54 is arranged, being provided with heater elements 55 and being supported by a screw jack device or other lifting device generally indicated at 56.

The chamber 54 is adapted to receive one of the polyamide containers of the type indicated in Figures 1 and 2 by the numeral 10, in Figures 3 and 4 by the numeral 24, and in Figures 5 and 6 by the numeral 31. For purposes of illustration, it is assumed that a container such as shown at 31 in Figures 5 and 6 is being charged by the equipment shown in Figures 7, 8 and 9. This charging is effected in the following manner. A plug 32 is inserted in one end of the container and tightfitting apertured plug 34 of material having a high coefficient of expansion is inserted into the other end, as indicated in Figure 7. Temporary supporting screws 57 are also inserted in the apertures toward the upper end of the container, and the container is then flushed with an inert gas, such as nitrogen, by means of a supply tube 58. This drives out the air and the container is then placed in the heating chamber 54 below one of the nozzles 50, as shown toward the right of Figure 8. The jack 56 is then operated to raise the assembly so as to bring the nozzle 50 into tight engagement with the aperture in the upper plug 34 to exclude air during loading. This plug 34 will remain (during the loading) in the desired position due to its thermal expansion against the side wall of the container tube. The corresponding valve 51 is then opened, and molten nylon is delivered from the extruder into the container 31. Preferably, the container 31 is preheated before the nitrogen flushing and before being charged from the extruder, and the desired relatively high temperature (at or somewhat above the melting point of the polyamide) of the container is maintained by the heater element 55 associated with the chamber 54. Upon receiving the desired charge, the jack 56 is lowered, and the container 31 taken out and assembled with a mold, such as the mold tube shown in Figures 5 and 6. The molding operation itself then proceeds in accordance with the description above, referring to Figures 5 and 6.

It is to be noted in connection with the operation described just above that a rupturable diaphragm such as indicated at 33 in Figure 5 is not included in the assembly of parts shown in Figure 8. This diaphragm may be omitted when using the technique of Figures 7 to 9 for loading the containers. If desired, however, such a diaphragm may be placed on top of the apertured plug 34 after the filling operation, so that when the container is assembled with a mold tube in the manner indicated in Figure 5, the diaphragm would lie between the apertured plug 34 and the plug 36.

The use of the method and equipment described above in relation to Figures 7 to 9 is of especial advantage in facilitating packing or charging of the containers with molten material at the temperature desired for initiation of the molding operation. This method and equipment also has the further advantage of enabling continuous operation of the screw extruder for melting the material being molded. Since two nozzles 50 are provided, and since the flow to these may be controlled by the valves 51, one container may be assembled under one of the nozzles 50 during the time the other nozzle 50 is in operation filling another container. When the container being charged is filled, it may then be removed and the valves adjusted to divert the flow to the newly assembled container, and so on.

Actual operation has shown that the use of the screw extruder for charging purposes, especially in the case of the high melting polyamides such as polyhexamethylene adipamide has materially reduced tendency for carbonization or discoloration to occur during the melting operation, which sometimes takes place in melting such polyamides under prolonged heating conditions.

It will be understood that in using the screw extruder technique for the filling of containers, various different plugs, apertured or otherwise, may be inserted into the end of the container after the charge has been delivered thereto, according to whatever molding technique is being employed. With reference to any such plugs, it should be kept in mind that in general they be formed of a metal having a coefficient of expansion somewhat higher than that of the metal of which the container tube itself is formed, and with frictional characteristics to avoid galling the tube. For instance the plugs may be made of aluminum bronze and the tubes of heat treated alloy steel. This insures the required tight fit at the molding temperature but facilitates removal of the plugs when the parts are cooled to room temperature.

In the molding of pieces from the polyamides, especially the high melting polyamides having substantial volumetric shrinkage upon solidification, it is contemplated that the pressure be built up to a high value, preferably in excess of 5000 lbs. per square inch, for instance from 10,000 lbs. to 70,000 lbs. per square inch. I have found a particularly effective pressure range to lie between about 10,000 lbs. and 40,000 lbs. per square inch.

Advantageously, the temperature of the molten polyamide in the container just prior to the molding operation should be appreciably above the freezing point of the polyamide. This will depend on the particular polyamide being used, but in general it may be said that the temperature should not be more than about 100° F. above the freezing point. Polyhexamethylene adipamide has a melting point at 507° F. and a freezing point at about 473° F., in view of which, with this particular polyamide, the temperature in the container just before molding should be upwards of about 480° F. and most advantageously from about 500° F. to 565° F. At temperatures appreciably higher than the latter figure, degradation or decomposition of the material is likely to occur.

In the case of polyhexamethylene sebacamide, no appreciable difference is observable between the melting and freezing points. Polyhexamethylene sebacamide has a melting point at about 455° F. and when using a material of such melting point, the temperature of the molten material in the container just prior to the molding operation should be from about 460° F. to about 510° F.

It is of especial advantage to utilize the screw extruder technique for melting the polyamide, particularly where containers of relatively large diameter are being employed. One reason for this is that the polyamides have a very low rate of thermal conductivity, in view of which, if a large mass of a material is to be melted by external application of heat, a very large time interval is required, or, alternatively, the heating temperature must be so high as to degrade the portions of the material initially heated, while the more interior portions are melting. With the screw extruder, however, the feed of the material through the heating zone is continuous and the heat is applied to a body of the material which is only relatively shallow, and in this way, the containers may be charged with a mass of molten material without requiring excessive heating of any portion thereof.

Turning now to the preheating of the molds, the preheating temperature may be between about 300 or 350° F. up to about 500° F., but it is preferred to preheat the molds within the range of from about 150° F. to about 25° F. below the melting point of the particular polyamide being used. Thus, in the case of polyhexamethylene adipamide (M. P. about 507° F.), it is preferred that the mold be preheated to a temperature of from 350° F. to 480° F. In the case of polyhexamethylene sebacamide, a preheating temperature of from 300° F. to 430° F. is preferred.

With respect to the preheating temperatures referred to just above, it will be understood that in cases where the mold is preheated at one point and is thereafter brought to a press for assembly with the container tube, some loss in preheating temperature may occur during this transport and assembly of parts.

With the molds preheated as above indicated the piece being formed is slowly cooled from the molten condition, and in consequence has improved hardness, wear resistance and other desirable properties, apparently resulting from a crystalline structure different from that obtained by molding in cooler molds.

In all of the molding techniques herein illustrated and described, it is of advantage for at least some purposes to actually transfer heat to the feeder head during the initial portion of the molding operation, this being especially true in the case of those polyamides having high volumetric shrinkage upon solidification. This may be accomplished by a heater element such as indicated at 13 in Figures 1 and 2, or by other suitable means.

I claim:

1. The method for molding elongated pieces from synthetic linear polyamides, which method comprises introducing a charge of the polyamide into a cylinder adapted to receive a liquid-tight pressure piston, preheating an elongated mold for the piece to be formed to a temperature within from 150° F. to 25° F. below the melting point of the polyamide, while the entire charge of the polyamide in the cylinder is in molten condition applying pressure thereto by means of said piston to force polyamide under pressure from the cylinder into an end of said preheated mold, the volume of the charge in the cylinder being greater than the volume of the mold to provide for maintenance of pressure by said piston during solidification of the piece being formed in the mold, and cooling the mold and the cylinder to effect cooling and solidification of the polyamide therein, the relative rates of cooling of the polyamide in the mold and in the cylinder providing for more rapid solidification of the polyamide in the mold so that molten polyamide may be fed under pressure from the cylinder to the mold during solidification of the polyamide in the mold.

2. A method according to claim 1 in which the polyamide used is polyhexamethylene adipamide and in which the mold is preheated to a temperature between 350° F. and 480° F.

3. A method according to claim 1 in which the polyamide used is polyhexamethylene sebacamide and in which the mold is preheated to a temperature between 300° F. and 430° F.

4. A method according to claim 1 in which the polyamide is charged into the cylinder in granular form and in which the charge is melted in said cylinder.

5. The method for molding elongated pieces from synthetic linear polyamides, which method comprises introducing a charge of the polyamide into a cylinder adapted to receive a pressure piston, preheating an elongated mold having a diameter appreciably less than that of the cylinder, the charge of polyamide in the cylinder being of greater volume than the volume of the mold to be filled, while the polyamide is in molten condition in said cylinder applying pressure thereto by means of said piston to force polyamide under pressure from the cylinder into an end of said preheated mold, cooling the polyamide in the mold and also the polyamide remaining in the cylinder while maintaining said pressure to thereby form a piece having an enlargement or head at one end thereof, and removing the formed piece from the mold by applying pressure to said enlargement or head and thereby drawing the piece under tension endwise out of the mold.

6. The method for molding pieces from synthetic linear polyamides which method comprises charging premelted polyamide into a preheated mold, and applying pressure to a piece being molded during cooling thereof in said mold, the temperature of the polyamide introduced into the mold being in a range from the freezing point thereof up to about 100° F. above said freezing point, and the mold being preheated to a temperature between 300° F. and 500° F.

7. A method according to claim 6 in which the polyamide used is polyhexamethylene adipamide, in which the polyamide is introduced into the mold at a temperature between about 500° F. and about 565° F., and in which the mold is preheated to a temperature between about 350° F. and about 480° F.

8. The method for molding articles from synthetic linear polyamides, which method comprises introducing a charge of the polyamide into a cylinder adapted to receive a pressure piston, while the polyamide is in molten condition in said cylinder applying pressure thereto by means of said piston to force the polyamide under pressure from the cylinder into a mold of smaller volume than that of the cylinder, the charge of polyamide in the cylinder being of greater volume than the volume of the mold to be filled, cooling the polyamide in the mold, effecting heat transfer to the polyamide in the cylinder during the intial cooling in the mold, and thereafter cooling the polyamide in the cylinder to thereby form a solidified enlargement integrally with the piece being molded.

9. The method according to claim 6 wherein the mold is preheated to a temperature from 150° F. to 25° F. below the melting point of the polyamide.

10. The method for molding pieces from synthetic linear polyamides which method comprises charging premelted polyamide into a preheated mold from a chamber containing such melted polyamide and having communication with said mold, the charging being effected by applying pressure to the premelted polyamide in the chamber to force the polyamide under pressure from the chamber into the mold, and applying pressure to a piece being molded during cooling thereof in said mold, the temperature of the polyamide introduced into the mold being in a range from the freezing point thereof up to about 100° F. above said freezing point, and the mold being preheated to a temperature from 150° F. to 25° F. below the melting point of the polyamide.

References Cited in the file of this patent

UNITED STATES PATENTS

| Number | Name | Date |
| --- | --- | --- |
| 1,206,150 | Slick | Nov. 28, 1916 |
| 1,679,408 | Davis et al. | Aug. 7, 1928 |
| 2,136,425 | Fields | Nov. 15, 1938 |
| 2,154,436 | Catlin | Apr. 18, 1939 |
| 2,212,772 | Graves | Aug. 27, 1940 |
| 2,295,942 | Fields | Sept. 15, 1942 |
| 2,305,362 | Taylor | Dec. 15, 1942 |
| 2,309,729 | Gordon | Feb. 2, 1943 |
| 2,327,079 | Wacker | Aug. 17, 1943 |
| 2,336,159 | Bent | Dec. 7, 1943 |
| 2,367,303 | Morin | June 16, 1945 |
| 2,570,284 | Stott et al. | Oct. 9, 1951 |